United States Patent
Bowns, IV et al.

[11] Patent Number: 5,919,575
[45] Date of Patent: Jul. 6, 1999

[54] PLASTIC LAMINATED STRUCTURAL BOARD AND METHOD FOR MAKING SAME

[75] Inventors: Edward Eton Bowns, IV, Suwanee, Ga.; David Carl Thornton, Cincinnati, Ohio

[73] Assignee: Rock-Tenn Company, Norcross, Ga.

[21] Appl. No.: 08/811,356

[22] Filed: Mar. 4, 1997

[51] Int. Cl.[6] .................................................. B32B 9/00
[52] U.S. Cl. .................. 428/537.5; 428/44; 428/114; 428/159; 428/172; 428/187; 428/198; 428/212; 428/220; 428/317.1; 428/319.3; 428/461; 428/511; 264/258; 264/311.11; 156/228; 156/243; 156/244.22
[58] Field of Search .................................. 428/535, 187, 428/537.5, 530, 285, 286, 461, 511, 514, 159, 198, 246, 248, 44, 287, 317.1, 319.3, 114, 172, 220, 212; 156/228, 244.22, 243; 264/258, 331.11

[56] References Cited

U.S. PATENT DOCUMENTS

| | | | |
|---|---|---|---|
| Re. 25,039 | 9/1961 | Frost et al. | 117/64 |
| 1,942,146 | 1/1934 | Kollek et al. | 91/68 |
| 2,343,740 | 3/1944 | Birmingham | 154/40 |
| 2,754,728 | 7/1956 | Runckel et al. | 92/39 |
| 2,759,847 | 8/1956 | Frost et al. | 117/64 |
| 2,801,198 | 7/1957 | Morris et al. | 154/43 |
| 2,897,109 | 7/1959 | Voigtman | 154/50 |
| 2,918,398 | 12/1959 | Dorland et al. | 162/132 |
| 2,955,970 | 10/1960 | Rice et al. | 154/102 |
| 3,406,052 | 10/1968 | Peters | 156/198 |
| 4,045,603 | 8/1977 | Smith | 428/2 |
| 4,083,743 | 4/1978 | Degens | 428/106 |
| 4,083,744 | 4/1978 | Degens | 156/306 |
| 4,158,713 | 6/1979 | Degens | 428/212 |
| 4,210,692 | 7/1980 | Bohme et al. | 428/106 |
| 4,552,792 | 11/1985 | Julian et al. | 428/40 |
| 4,865,912 | 9/1989 | Mitsumata | 428/285 |

FOREIGN PATENT DOCUMENTS

| | | |
|---|---|---|
| 0 542 143 A1 | 11/1992 | European Pat. Off. |
| 27 28 977 A1 | 6/1977 | Germany |

*Primary Examiner*—Deborah Jones
*Assistant Examiner*—Abraham Bahta
*Attorney, Agent, or Firm*—Jones & Askew, LLP

[57] ABSTRACT

A plastic laminated structural board is provided for use in a variety of applications such as furniture fabrication. The plastic laminated structural board utilizes a composite structure which includes a polymer layer adhered to an underlying paperboard core. The polymer layer masks surface imperfections in the underlying paperboard core, and the polymer layer is substantially free from imperfections and provides a strong and smooth surface for receiving a decorative paper layer. A polymer layer may by adhered to both sides of the paperboard core. Both sides of the composite structure may be finished with a decorative paper layer. The polymer layer may be impregnated with filler material to provide bonding sites and moisture permeability sites in the polymer layer.

25 Claims, 3 Drawing Sheets

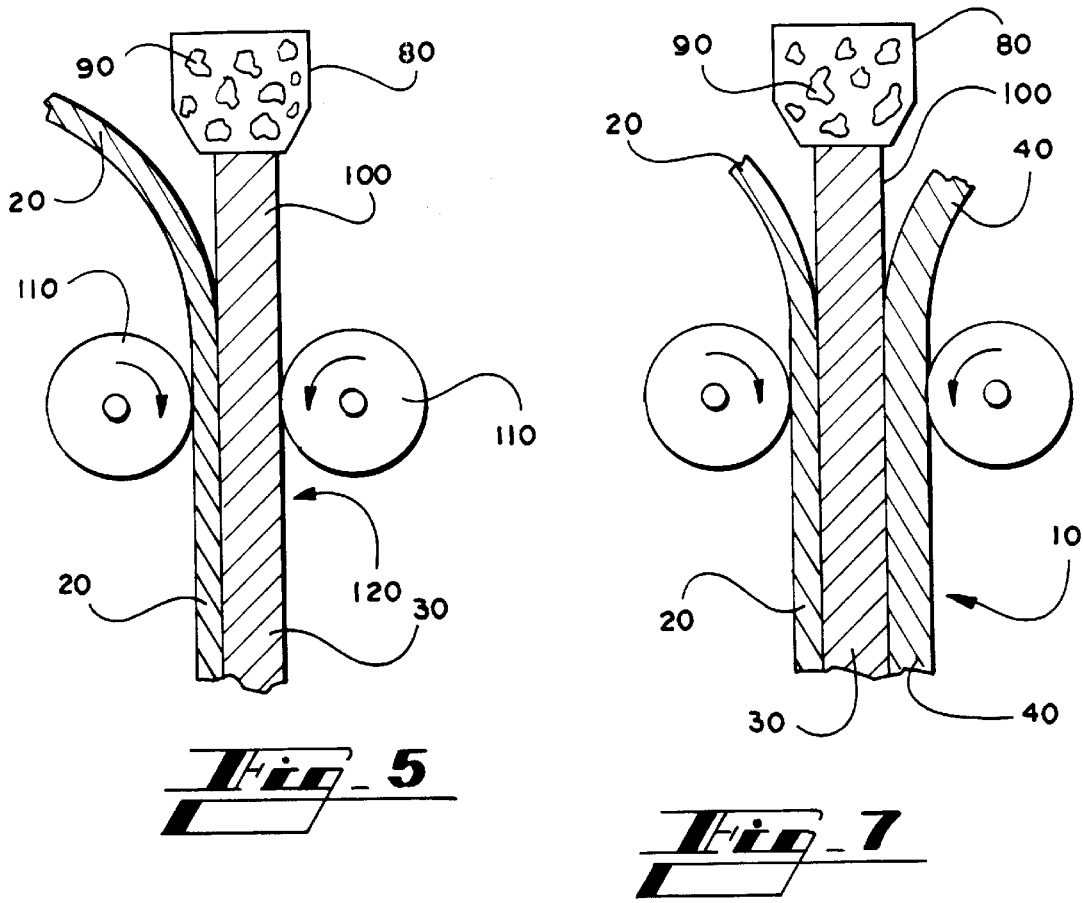
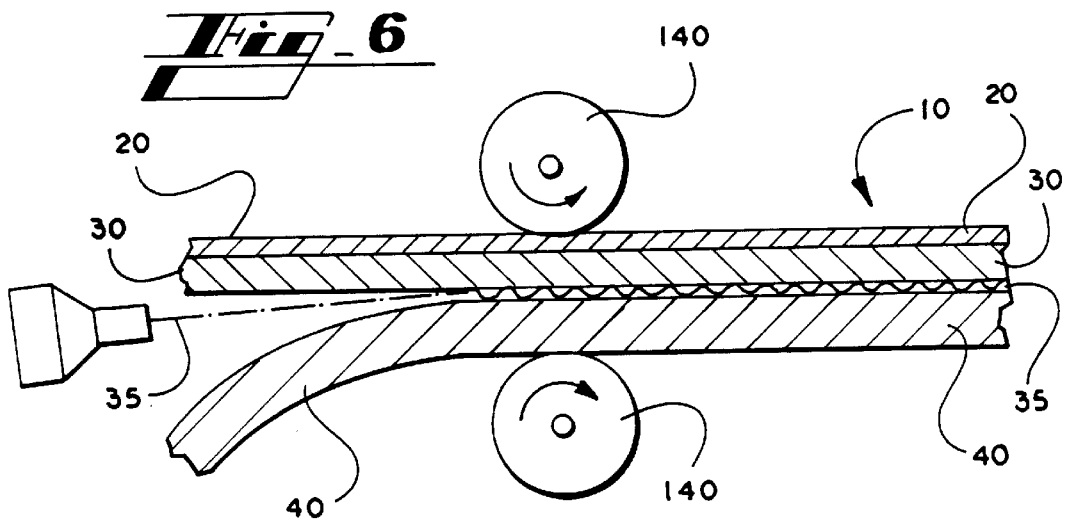

PLASTIC LAMINATED STRUCTURAL BOARD AND METHOD FOR MAKING SAME

FIELD OF INVENTION

The present invention relates generally to structural and decorative boards and panels, and more particularly, relates to a composite board or panel utilizing a polymer layer adhered to a paperboard core to provide a strong and very smooth surface for receiving a final decorative paper layer and includes a method for making such composite boards or panels.

BACKGROUND OF THE INVENTION

In recent years, the demand for composite boards and panels has greatly increased, particularly in the furniture fabrication industry. In a typical application, a paperboard or wood panel may be laminated with a printed paper layer, such as an artificial wood grain design, for use on the interior and exterior surfaces of a piece of furniture, such as a desk, bookshelf or table. For example, the backing board behind a shelving unit may typically be made of such a composite panel. In these types of composite boards or panels, the paperboard or wood panel provides a relatively rough surface for lamination of the printed paper sheet. Undulations, pits, cracks, and/or holes in the underlying paperboard or wood surface tend to translate through to the overlying printed paper sheet. These imperfections reflect the light cast on the surface of the printed paper sheet and obscure the customer's view and appreciation of the product.

It is known in the art to prepare multi-layered composite boards comprised of a variety of layers, such as paperboard, wood, and plastic. It is also known in the art to prepare laminates of paperboard and polymer, such as the familiar restaurant menu comprised of a paperboard layer laminated with a thin layer of flexible plastic.

The fibrous sheet covered plywood disclosed in U.S. Pat. No. 2,343,740 relates to plywood panels having broad faces covered with a resin-impregnated loosely matted pulp sheet integrally bonded to the plywood panel and presenting finished smooth surfaces on the panel. The integrally bonded pulp sheets provide a covering for imperfect surface veneers of plywood panels and mask imperfections thereon.

The composition board disclosed in U.S. Pat. No. 4,083,743 discloses a cured thin sheet material comprising first and second fiber sheet materials bonded together to form an integral sheet which may then be bonded to a substrate material such as hardboard, plywood, natural wood, wallboard, or composition board and may be employed for use in furniture, countertops and wall surfaces.

A decorative laminated wall panel is disclosed in U.S. Pat. No. 4,552,792 and includes a center ply formed from a wood veneer, a back ply formed from a kraft liner board or paperboard and a face ply. A thin decorative paper is laminated to the face ply.

A decorative laminated structure having a core formed from several sheets of kraft paper impregnated with a blend of phenolic resin is disclosed in U.S. Pat. No. 2,801,198. The decorative laminated structure has a decorative sheet impregnated with melamine-formaldehyde resin and a translucent overlay sheet also impregnated with a melamine-formaldehyde resin. A bottom overlay sheet is also impregnated with melamine-formaldehyde resin and may be applied to the opposite side of the core.

Those systems, which disclose a variety of multi-layered composition board and panels, may be used in the construction of furniture, but those prior art articles do not provide for a smooth surface, free from imperfections, on which to adhere a decorative layer.

SUMMARY OF THE INVENTION

The present invention provides a composite structural and decorative board or panel which provides a strong and smooth surface for receiving a final decorative layer. The present invention employs a polymer layer adhered to an underlying paperboard core. The polymer layer is substantially free from surface imperfections, and thus provides a strong and smooth surface for receiving a decoratively printed paper layer. The polymer layer masks imperfections in the underlying paperboard core to prevent the final decorative layer from conforming to the imperfections in the underlying paperboard core. The composite structural board of the present invention may be used in a variety of applications, such as furniture fabrication.

Generally described, one aspect of the present invention provides a composite board, comprising a top layer formed from a thin material, the top layer having an upper surface and a lower surface; a center layer formed from a polymer material, the center layer having an upper surface and a lower surface, the upper surface of the center layer being adhered to the lower surface of the top layer; and a bottom layer formed from a paperboard core, the bottom layer having an upper surface and a lower surface, the upper surface of the bottom layer being adhered to the lower surface of the center layer.

Preferably, the upper surface of the center layer is substantially smooth for receiving the top layer, and the center layer masks imperfections in the upper surface of the bottom layer. The center layer may prevent warping of the composite board, and the center layer may provide a barrier to liquids. The center layer preferably is substantially rigid.

The thin material may comprise a decorative paper layer, where the decorative paper layer has a decorative pattern imprinted on an upper surface of the decorative paper layer. Alternatively, the thin material may comprise a metallic foil layer or plastic layer. The polymer material may be a member selected from a group consisting of polyethylene terephthalate, polyethylene, polystyrene, polyvinyl chloride, and polypropylene. If desired, the polymer material may contain moisture to provide the center layer with improved cutting characteristics. If desired, the polymer material may be impregnated with a filler material, the filler material being a member selected from the group consisting of clay, calcium carbonate, titanium dioxide, talc, paper fibers, and mixtures thereof. The paperboard core may comprise a plurality of paperboard layers.

The top layer may have a thickness of between about 0.001 inches (0.0025 cm) and 0.010 inches (0.025 cm). The center layer may have a thickness of between about 0.002 inches (0.005 cm) and 0.020 inches (0.050 cm). The bottom layer may have a thickness of between about 0.012 inches (0.030 cm) and 0.240 inches (0.61 cm). The surface of the top layer may comprise a decorative print.

Another aspect of the present invention provides a composite board, comprising a first layer formed from a first paper layer, the first layer having an upper surface and a lower surface; a second layer formed from a first polymer layer, the second layer having an upper surface and a lower surface, the upper surface of the second layer being adhered to the lower surface of the first layer; a third layer formed from a first paperboard core, the third layer having an upper surface and a lower surface, the upper surface of the third layer being adhered to the lower surface of the second layer; and a fourth layer having an upper surface and a lower surface, the fourth layer being formed from a second polymer layer, the second polymer layer having an upper surface and a lower surface, the upper surface of the fourth layer being adhered to the lower surface of the third layer. The first paperboard core may be comprised of a plurality of paperboard layers.

The composite board of this aspect may comprise a fifth layer formed from a second paper layer, the fifth layer having an upper side and a lower side, the upper side of the fifth layer being adhered to the lower side of the fourth layer. Alternatively, the composite board of this aspect may comprise a fifth layer formed from a second paperboard core, the fifth layer having an upper side and a lower side, the upper side of the fifth layer being adhered to the lower side of the fourth layer. If desired, the fourth layer of the composite board alternatively further may comprise a second paperboard core adhered to the second polymer layer.

The upper surface of the first layer may comprise a decorative print. The lower surface of the fifth layer may comprise a decorative print.

Another aspect of the present invention provides a method of making a composite board, comprising the steps of adhering a first paper layer to a first polymer layer to form a two-ply material, the first paper layer having an upper surface and a lower surface, the first polymer layer having an upper surface and a lower surface, such that the upper surface of the first polymer layer is adhered to the lower surface of the first paper layer; and adhering a first paperboard core to the two-ply material to form the composite board, the first paperboard core having an upper surface and a lower surface, such that the upper surface of the first paperboard core is adhered to the lower surface of the first polymer layer of the two-ply material.

The method may comprise the step of adhering a second paperboard core to the lower surface of the first paperboard core. Alternatively, the method may comprise adhering a plurality of additional paperboard cores to the lower surface of the first paperboard core.

The method may comprise the step of adhering a second polymer layer to the lower surface of the first paperboard core, the second polymer layer having an upper surface and a lower surface, the upper surface of the second polymer layer being adhered to the lower surface of the first paperboard core. The method may also comprise the step of adhering a second paper layer to the lower surface of the second polymer layer, the second paper layer having an upper surface and a lower surface, the upper surface of the second paper layer being adhered to the lower surface of the second polymer layer.

The step of adhering a first paper layer to an upper surface of a first polymer layer to form a two-ply material may comprise the step of extruding the first polymer layer onto a lower surface of the first paper layer such that the upper surface of the first polymer layer is adhered to the lower surface of the first paper layer. The step of adhering a first paperboard core to a lower surface of the first polymer layer, may comprise the step of laminating the two-ply material to the upper surface of the first paperboard core such that the lower surface of the first polymer material of the two-ply material is adhered to the upper surface of the first paperboard core.

Another aspect of the present invention provides a method of making a composite board, comprising extruding a polymer layer between a paper layer and a paperboard core to form a three-ply product.

Other objects, features, and advantages of the present invention will become apparent upon reading the following specification, when taken in conjunction with the drawings and the appended claims.

BRIEF DESCRIPTION OF THE DRAWINGS

FIG. 5 is a schematic illustration of an extrusion process for preparing a portion of the plastic laminated structural board shown in FIG. 1.

FIG. 6 is a schematic sectional fragmentary view of a lamination process used to prepare a portion of the plastic laminated structural board shown in FIG. 1.

FIG. 7 is a schematic sectional fragmentary view showing an alternative extrusion process for producing the plastic laminated structural board shown in FIG. 1.

DETAILED DESCRIPTION

Figure 1:
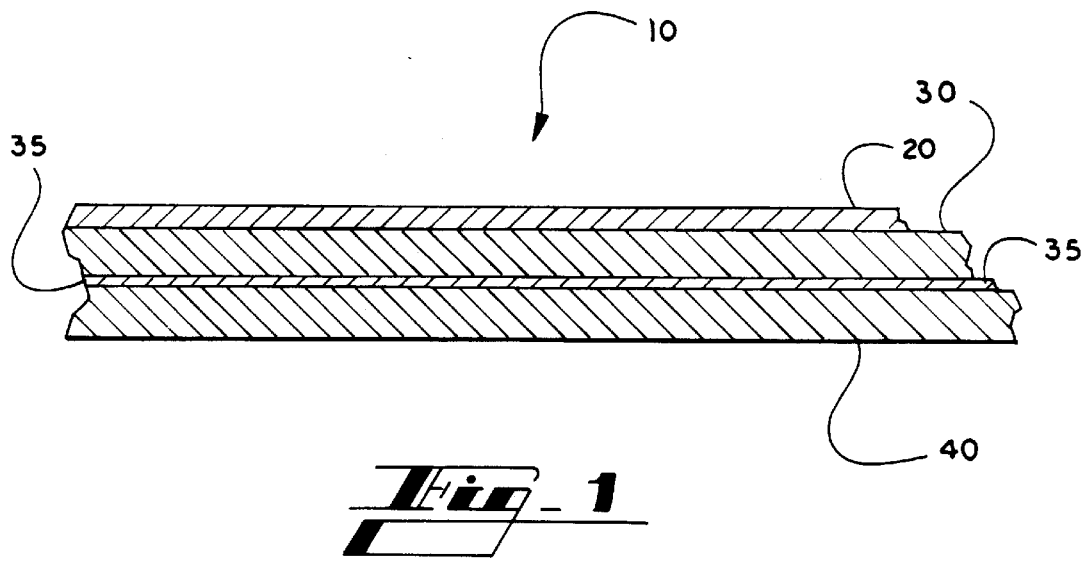
FIG. 1 is a partial cross-sectional view of the plastic laminated structural board of the present invention.

Referring now in more detail to the drawings, in which like numerals represent like parts throughout the several drawings, FIG. 1 shows a plastic laminated structural board 10 embodying the present invention. With reference to FIGS. 1 through 7, the plastic laminated structural board 10 preferably includes three layers consisting of a decorative paper layer 20, a polymer layer 30, and a paperboard core 40. As shown in FIG. 3, multiple layers of a paperboard core 40 may be used and both sides of the plastic laminated structural board 10 may be finished with polymer layers 30 and decorative layers 20. A filler impregnated polymer layer 50 may be used in place of the polymer layer 30. The plastic laminated structural board 10 is preferably produced using a two-step extrusion/lamination process, or may be produced using a one-step extrusion process. The articles and processes thus far noted now will be described in detail.

Figure 2:
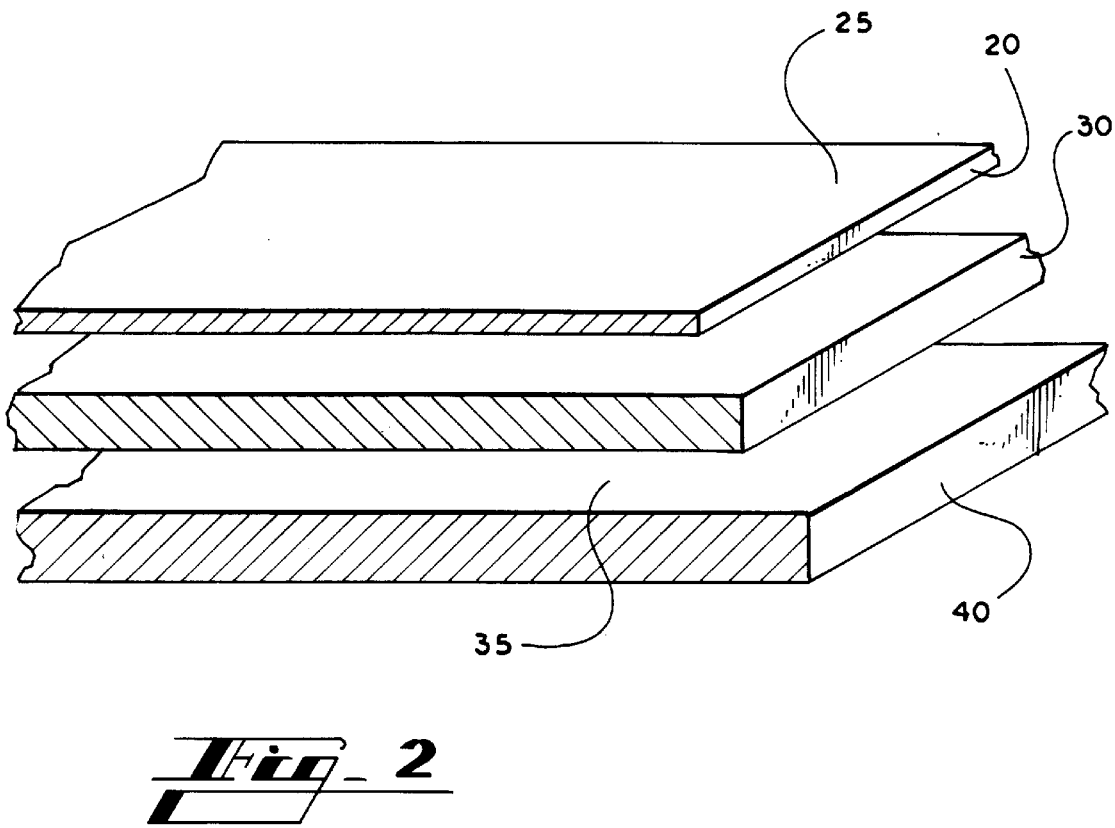
FIG. 2 is an exploded perspective view of the plastic laminated structural board of FIG. 1.
Figure 3:
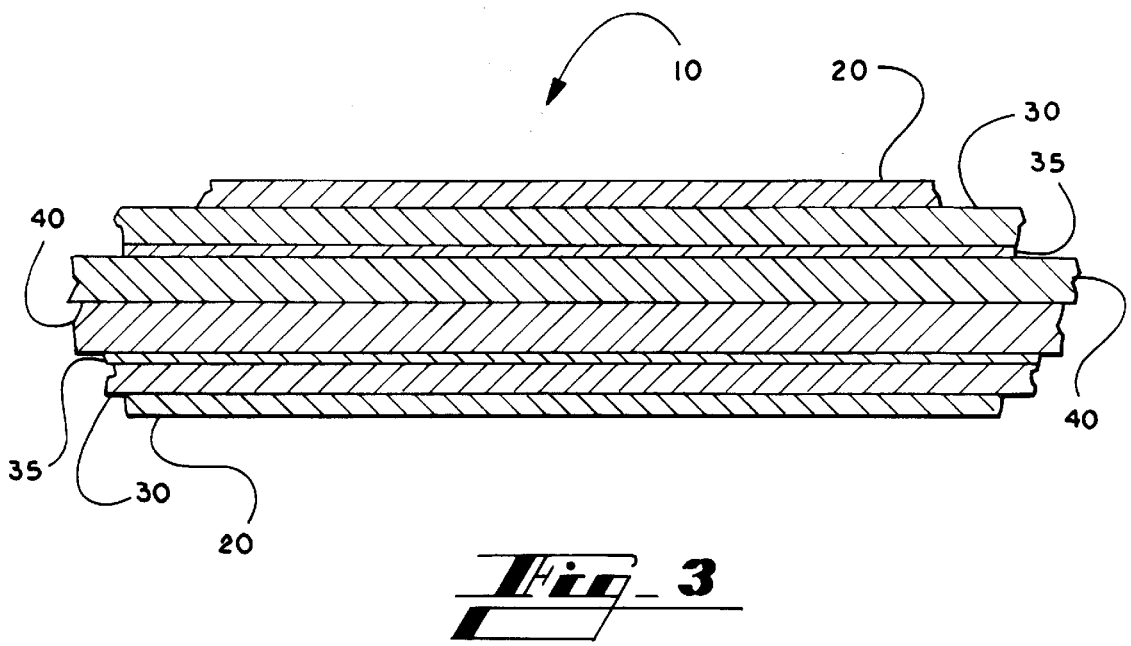
FIG. 3 is a cross-sectional view of a multi-layer plastic laminated structural board.

Referring now to FIGS. 1 and 2, FIG. 1 is a partial cross-sectional view of the plastic laminated structural board 10 of the present invention and FIG. 2 is an exploded perspective view of the plastic laminated structural board 10 of FIG. 1. As shown in FIG. 1, the plastic laminated structural board 10 embodying the present invention preferably includes three layers. A first or top layer is comprised of a thin material which is adhered to a polymer layer 30 by an extrusion process, to be discussed in detail below. The top layer may include a variety of suitable materials, such as paper, metallic foil, or plastic. Preferably, the top layer is a decorative paper layer or sheet 20 having a thickness on the order of 0.001–0.010 inches (0.0025–0.025 cm). As shown in FIG. 2, the upper surface 25 of the decorative paper layer 20 includes a decorative pattern printed thereon, as desired by the end user. For example, and as illustrated in FIG. 2, the upper surface 25 of the decorative paper layer 20 may include a wood grain pattern for use in furniture construction. Optionally, the decorative paper layer 20 may be protected or waterproofed by adding a thin polymer layer (not shown) to the upper surface of the decorative paper layer 20.

As will be discussed in detail below, a center or second layer of the plastic laminated structural board 10 preferably is a polymer layer 30 applied to the decorative paper layer 20 by an extrusion process. In the preferred embodiment of the present invention, the polymer layer 30 is substantially rigid. However, the degree of rigidity of the polymer layer 30 is not critical, and the polymer layer 30 may be flexible so long as the upper surface of the polymer layer 30 forms a smooth and strong surface on which to adhere a final decorative paper layer 20. The polymer layer 30 preferably has a thickness on the order of 0.005–0.010 inches (0.013–0.025 cm). However, it should be understood that the polymer layer 30 may have a thickness on the order of 0.002–0.020 inches (0.005–0.050 cm). Preferably, the polymer layer 30 is made from recycled polyethylene terephthalate (PET) of the type used to make clear soft drink bottles. Other suitable plastics may include virgin or recycled high impact polystyrene, virgin polyethylene terephthalate (PET), polyvinyl chloride, virgin or recycled high density polyethylene, and polypropylene.

The polymer layer 30 provides a very smooth surface on which to adhere the decorative paper layer 20. As briefly discussed in the Background section above, other surfaces such as paperboard or wood typically have surface imperfections. If a decorative paper layer is adhered directly to the surface of a paperboard or wood core, the surface of the decorative paper layer tends to conform to these imperfections to form undulations in the upper surface of the decorative paper layer. This is disadvantageous because such undulations in the upper surface of the decorative paper layer reflect light to cause light areas and shadow areas visible to the end user. As a result, the end user is able to easily detect that the board or panel is not real wood. In the example of a printed wood grain pattern, the synthetic wood grain will be easily distinguished from natural wood to give an undesirable effect.

This problem is solved by the plastic laminated structural board 10, according to the present invention, in which the polymer layer 30 provides a smooth surface, free from imperfections. Accordingly, the overlying decorative layer 20 will likewise be free from imperfections and will present a better finish. The polymer layer 30 prevents warping of the plastic laminated structural board 10 and provides a barrier to liquids. Also, the polymer layer 30 assists in retaining the heads of nails or screws in an underlying surface.

As shown in FIGS. 1 and 2, the decorative paper layer 20 and the polymer layer 30 are adhered to a third or bottom layer preferably comprised of a paperboard core 40. As will be discussed in detail below, the paperboard core 40 preferably is adhered to the polymer layer 30 with the decorative paper layer 20 using conventional adhesives 35. Suitable adhesives may include a variety of solvent-based and water-based adhesives and may include the use of extruded polymers as a suitable adhesive. The paperboard core 40 may be comprised of multiple layers of paperboard and preferably has a thickness on the order of 0.012–0.240 inches (0.030–0.61 cm). It should be understood that the paperboard core 40 may include a plurality of paperboard sheets to provide a thickness desired by the end user.

As shown in FIG. 3, multiple plies or layers of the paperboard core 40 may be used to provide additional thickness and strength. If desired, a polymer layer 30 may be adhered to both sides of the paperboard core 40, as shown in FIG. 3 to provide additional strength, thickness, rigidity, and to act as a liquid barrier to protect the paperboard core 40. Likewise, if desired, a decorative paper layer 20 may be adhered to the additional polymer layer 30 to finish both sides of the plastic laminated structural board 10, as shown in FIG. 3.

Figure 4:
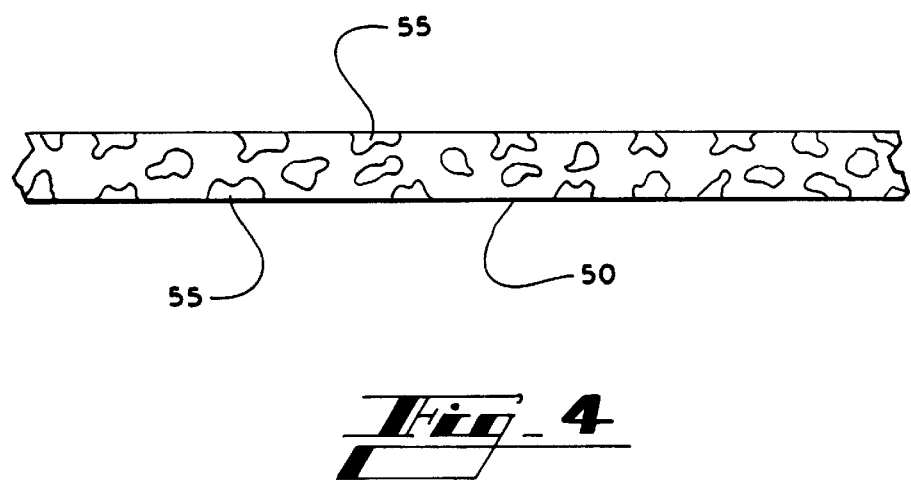
FIG. 4 is a cross-sectional view of a filler impregnated polymer layer.

As shown in FIG. 4, a filler impregnated polymer layer 50 may be used, alternatively, in place of the polymer layer 30, shown in FIGS. 1–3. The filler impregnated polymer layer 50 is filled with filler particulates 55. The filler impregnated polymer layer 50 may include up to sixty percent (60%) filler particulates 55. Preferably, the ratio of filler particulates 55 to polymer is on the order of twenty to thirty percent (20%–30%) filler particulates 55 and seventy to eighty percent (70%–80%) polymer. The use of the filler particulates 55 provides bonding sites for adhering the filler impregnated polymer layer 50 to other surfaces, such as a decorative paper layer 20 and a paperboard core 40. Preferably the filler particulates 55 provide areas of moisture permeability, lower the density of the layer 50, increase the stiffness of the layer 50, and make the layer 50 easier to cut in subsequent die cutting processes. Suitable filler particulates 55 include clay, calcium carbonate, talc, titanium dioxide and paper fibers.

As noted above, the plastic laminated structural board 10 is preferably produced using a two-step extrusion/lamination process. As shown in FIG. 5, the first step of the two-step extrusion/lamination process provides for extrusion of the polymer layer 30 by conventional extrusion processes as are well known to those skilled in the art.

As shown in FIG. 5, preferably a polymer material 90 in the form of flakes or granules is placed in an extruder 80. A semi-molten polymer extrudate 100 is extruded vertically between two chilled pinch rollers 110, as shown in FIG. 5. As the semi-molten polymer extrudate 100 is lowered vertically between the chilled pinch rollers 110, a decorative paper layer 20 is fed between the pinch rollers 110 against the semi-molten polymer extrudate 100. The decorative paper layer 20 adheres to the semi-molten polymer extrudate 100 without adhesives. The action of the chilled pinch rollers 110 on the semi-molten polymer extrudate 100 forms the polymer layer 30, as shown in FIG. 5. The polymer layer 30 and the decorative paper layer 20 exit from the chilled pinch roller 110 as a two-ply material 120. Moisture may be left in the polymer layer to allow the layer to fracture more easily during subsequent cutting processes.

If desired, the filler impregnated polymer layer 50, as shown in FIG. 4, may be used in preparation of the plastic laminated structure board 10. As will be readily understood to those skilled in the art, the filler particulates 55 are placed in the extruder 80 along with the polymer material 90. Alternatively, as is known to those skilled in the art, polymer material 90 which already contains filler particulates 55 may be purchased from commercially available sources. Accordingly, the semi-molten extrudate 100 contains the filler particulates 55. Likewise, the two-ply material 120, shown in FIG. 5, is comprised of the decorative paper layer 20 and the filler impregnated polymer layer 50 (not shown).

The second step of the two-step extrusion/lamination process is illustrated in FIG. 6. As shown in FIG. 6, the two-ply material 120 (including the decorative paper layer 20 and the polymer layer 30) is fed through a pair of pinch rollers 140 over the paperboard core 40. Adhesive 35 is applied between the two-ply material 120 and the paperboard core 40 before they are pressed together by the pinch rollers 140. Thus, the two-ply material 120 is laminated to the paperboard core 40 to produce the plastic laminated structural board 10, shown in FIG. 6.

Optionally, additional paperboard layers may be laminated to the paperboard core 40 by repeating the second step (lamination) discussed above. Likewise, as shown in FIG. 3, a second polymer layer 30 may be laminated to the lower surface of the paperboard core 40 to finish both sides of the plastic laminated structural board 10. If desired, a second paperboard core may be adhered to the bottom side of the second polymer layer 30. And, if desired, both sides of the plastic laminated structural board 10 may be finished with a decorative paper layer 20 by lamination of the two-ply material 120, illustrated in FIG. 5 to the plastic laminated structural board 10, illustrated in FIG. 6.

An alternative one-step process for producing the plastic laminated structural board 10 is illustrated in FIG. 7. As shown in FIG. 7, the plastic laminated structural board 10 may be produced in one step by extruding the polymer layer 30 between a decorative paper layer 20 and a paperboard core 40. As discussed above, a polymer material 90 is extruded in the form of a semi-molten extrudate 100. The semi-molten extrudate 100 is lowered between a decorative paper layer 20 and a paperboard core 40, as shown in FIG. 7. The decorative paper layer 20, the semi-molten extrudate 100 and the paperboard core 40 are pressed together by a pair of chilled pinch rollers 110 to produce a three-ply plastic laminated structural board 10 comprised of the decorative paper layer 20, the polymer layer 30 and the paperboard core 40, as shown in FIG. 7. If desired, the plastic laminated structural board 10 produced by this alternative process may be laminated to additional paperboard core 40 and to additional polymer layers 30 and decorative paper layers 20, as discussed above.

EXAMPLE 1

A continuous decorative paper layer 20 having a wood grain print 25 and having a thickness of 0.002 inches is fed between a pair of chilled pinch rollers 110, as shown in FIG. 5. A supply of recycled PET in granular form is placed in an extruder 80. A semi-molten extrudate 100 is extruded from the extruder 80, as shown in FIG. 5, and is allowed to drop between the chilled pinch rollers against the decorative paper layer 20. At the exit of the chilled pinch rollers, the semi-molten extrudate 100 hardens to form a polymer layer 30 having a thickness of 0.008 inches (0.02 cm). The polymer layer 30 is adhered to the decorative paper layer 20 to form a two-ply material 120, as shown in FIG. 5.

The two-ply material 120 is fed horizontally between a pair of pinch rollers 140 and overlaying a continuous paperboard core 40, as shown in FIG. 6. The continuous paperboard core 40 has a thickness of 0.030 inches (0.076 cm). Water-based glue 35 is dispensed between the paperboard core 40 and the two-ply material 120, as shown in FIG. 6. The two-ply material 120 and paperboard core 40 are pressed together by the pinch rollers 140 and exit the pinch rollers 140 as a three-ply plastic laminated structural board 10. The plastic laminated structural board 10 is comprised of a decorative paper layer 20, a polymer layer 30, and a paperboard core 40, as shown in FIG. 1.

The resulting plastic laminated structural board 10 is found to be rigid and quite strong. The wood grain print on the decorative paper layer 20 is substantially free of surface imperfections and has a finish and visual quality that is very similar to a natural wood panel.

EXAMPLE 2

A continuous length of the three-ply plastic laminated structural board 10 produced in Example 1 is fed horizontally between a pair of pinch rollers 140 overlaying a second continuous length of three-ply plastic laminated structural board 10 produced in Example 1. The paperboard core 40 of each of the three-ply plastic laminated structural boards 10 are facing each other prior to entry between the pinch rollers 140. Water-based glue 35 is dispensed between the two three-ply plastic laminated structural boards 10 before they travel between the pinch rollers 140. A six-ply plastic laminated structural board 10, as shown in FIG. 3, exits from the pinch rollers 140.

The resulting six-ply plastic laminated structural board 10 is found to have a smooth wood grain finish on both sides. The wood grain finish on the decorative paper layers 20 on each side of the six-ply plastic laminated structural board 10 is found to be substantially free of surface imperfections and has a finish and visual quality that is very similar to a natural wood panel.

EXAMPLE 3

A supply of calcium carbonate is mixed with a supply of polyethylene 90 in the extruder 80 of Example 1. As with Example 1, a semi-molten extrudate 100 is extruded from the extruder 80 between a pair of chilled pinch rollers 110 and is adhered to a decorative paper layer 20, as is illustrated in FIG. 5. In contrast to the two-ply material 120 prepared in Example 1, a two-ply material 120 is prepared in the present example comprising a decorative paper layer 20 and a filler impregnated polymer layer 50. The filler impregnated polymer layer 50 is found to contain a plurality of randomly spaced calcium carbonate sites on the surface of the filler impregnated polymer layer 50. The surface of the filler impregnated polymer layer 50 is found to be smooth and substantially free of surface imperfections. As with Example 1, the two-ply material 120 of the present example is laminated to a paperboard core 40, as shown in FIG. 6. A resulting three-ply plastic laminated structural board 10 is prepared having similar qualities to those found in the three-ply plastic laminated structural board 10 produced in Example 1.

While the present invention in its various aspects has been described in detail with regard to the preferred embodiments thereof, it should be understood that variations, modifications, and enhancements can be made to the disclosed articles and methods without departing from the spirit and scope of the present invention as defined in the appended claims.

What is claimed is:

1. A composite board, comprising:
   a top decorative paper layer having an upper surface and a lower surface, said upper surface intended to be visible on the exterior surface of an end product;
   a center layer formed from a solid sheet of polymer material, said center layer having an upper surface and a lower surface, said upper surface of said center layer being adhered to said lower surface of said top layer; and
   a bottom layer formed from a paperboard core, said bottom layer having an upper surface and a lower surface, said upper surface of said bottom layer being adhered to said lower surface of said center layer.

2. The composite board of claim 1, wherein said upper surface of said center layer is substantially smooth for receiving said top layer.

3. The composite board of claim 2, wherein said center layer masks imperfections in said upper surface of said bottom layer.

4. The composite board of claim 1, wherein said center layer prevents warping of said composite board.

5. The composite board of claim 1, wherein said center layer provides a barrier to liquids.

6. The composite board of claim 1, wherein said center layer is substantially rigid.

7. The composite board of claim 1, wherein said top layer comprises a decorative paper layer, said decorative paper layer having a decorative pattern imprinted on an upper surface of said decorative paper layer.

8. The composite board of claim 1, wherein said top layer comprises a metallic foil layer.

9. The composite board of claim 1, wherein said top layer comprises a plastic layer.

10. The composite board of claim 1, wherein said polymer material is a member selected from a group consisting of polyethylene terephthalate, polyethylene, polystyrene, polyvinyl chloride, and polypropylene.

11. The composite board of claim 1, wherein said polymer material contains moisture to provide said center layer with improved cutting characteristics.

12. The composite board of claim 1, wherein said polymer material is impregnated with a filler material, said filler material being a member selected from the group consisting of clay, calcium carbonate, titanium dioxide, talc, paper fibers, and mixtures thereof.

13. The composite board of claim 1, wherein said paperboard core is comprised of a plurality of paperboard layers.

14. The composite board of claim 1, wherein said top layer has a thickness of between about 0.001 inches (0.0025 cm) and 0.010 inches (0.025 cm).

15. The composite board of claim 1, wherein said center layer has a thickness of between about 0.002 inches (0.005 cm) and 0.020 inches (0.050 cm).

16. The composite board of claim 1, wherein said bottom layer has a thickness of between about 0.012 inches (0.030 cm) and 0.240 inches (0.61 cm).

17. A composite board, comprising:
    a first decorative layer formed from a first paper layer, said first decorative layer having an upper surface and a lower surface, said upper surface intended to be visible on the exterior surface of an end product;
    a second layer formed from a first solid sheet of polymer material, said second layer having an upper surface and a lower surface, said upper surface of said second layer being adhered to said lower surface of said first decorative layer;
    a third layer formed from a first paperboard core, said third layer having an upper surface and a lower surface, said upper surface of said third layer being adhered to said lower surface of said second layer; and
    a fourth layer having an upper surface and a lower surface, said fourth layer formed from a second solid sheet of polymer material, said second polymer layer having an upper surface and a lower surface, said upper surface of said fourth layer being adhered to said lower surface of said third layer.

18. The composite board of claim 17, further comprising a fifth layer formed from a second paper layer, said fifth layer having an upper side and a lower side, said upper side of said fifth layer being adhered to said lower side of said fourth layer.

19. The composite board of claim 17, further comprising a fifth layer formed from a second paperboard core, said fifth layer having an upper side and a lower side, said upper side of said fifth layer being adhered to said lower side of said fourth layer.

20. The composite board of claim 17, wherein said first paperboard core is comprised of a plurality of paperboard layers.

21. The composite board of claim 17, wherein said fourth layer further comprises a second paperboard core, said second paperboard core having an upper surface and a lower surface, said upper surface of said second paperboard core being adhered to said lower surface of said second solid sheet of polymer material.

22. The composite board of claim 17, wherein said upper surface of said first layer comprises a decorative print.

23. The composite board of claim 18, wherein said lower surface of said fifth layer comprises a decorative print.

24. A furniture product, comprising:
    at least one visible exterior surface formed from a composite board, said composite board, comprising:
        a top decorative paper layer having an upper surface and a lower surface, said upper surface intended to be visible on said one visible exterior surface of said furniture product;
        a center layer formed from a substantially rigid layer of polymer material, said center layer having an upper surface and a lower surface, said upper surface of said center layer being adhered to said lower surface of said top layer; and
        a bottom layer formed from a paperboard core, said bottom layer having an upper surface and a lower surface, said upper surface of said bottom layer being adhered to said lower surface of said center layer.

25. A composite board, comprising:
    a top decorative plastic layer having an upper surface and a lower surface, said upper surface intended to be visible on the exterior surface of an end product;
    a center layer formed from a substantially rigid layer of polymer material, said center layer having an upper surface and a lower surface, said upper surface of said center layer being adhered to said lower surface of said top layer; and
    a bottom layer formed from a paperboard core, said bottom layer having an upper surface and a lower surface, said upper surface of said bottom layer being adhered to said lower surface of said center layer.

* * * * *